Figure 1:
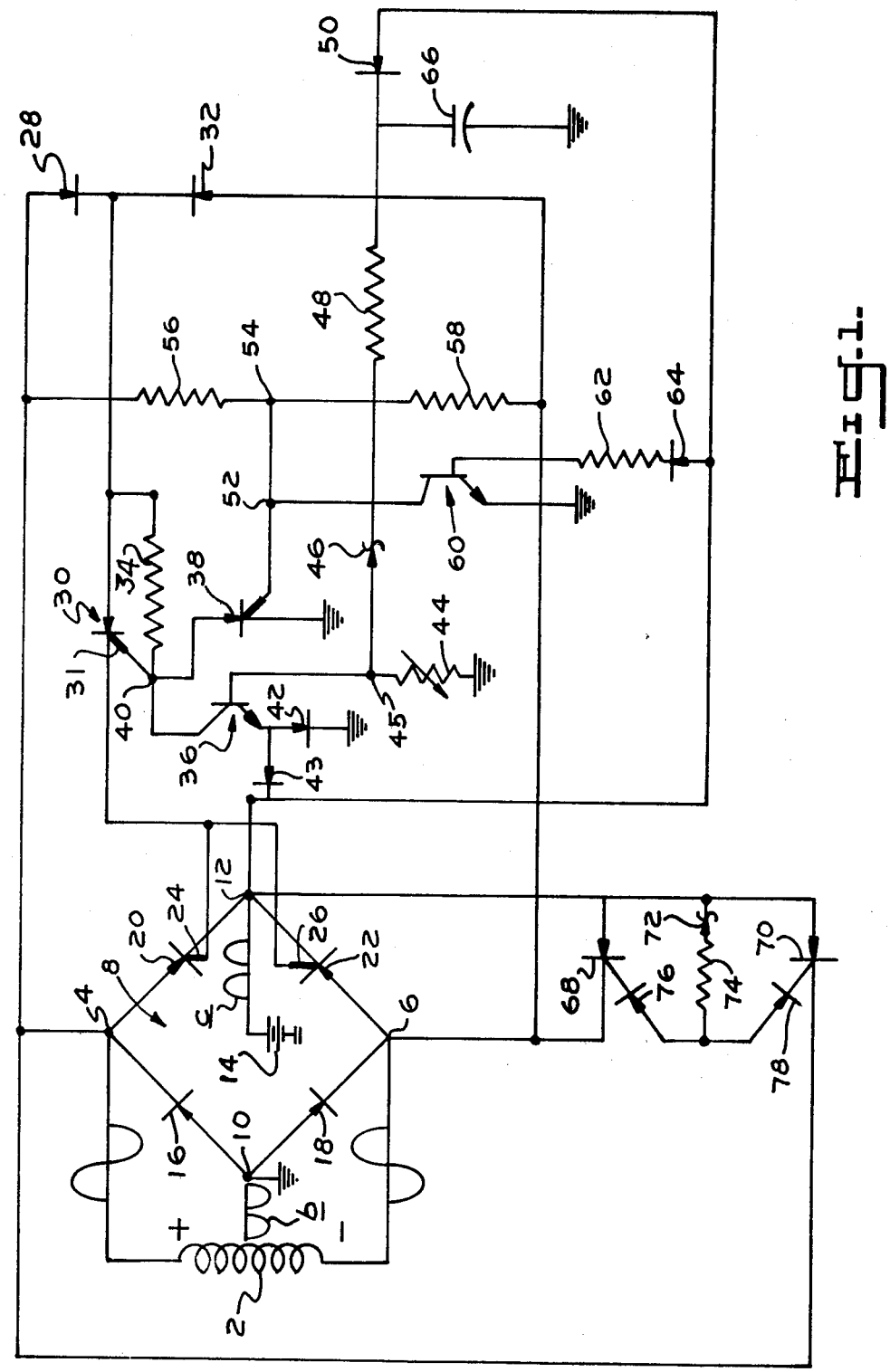

United States Patent [19]
Piteo

[11] Patent Number: 4,458,195
[45] Date of Patent: Jul. 3, 1984

[54] ELECTRONIC REGULATOR FOR ALTERNATOR BATTERY CHARGING SYSTEM

[75] Inventor: Michael J. Piteo, Enfield, Conn.

[73] Assignee: R. E. Phelon Company, Inc., East Longmeadow, Mass.

[21] Appl. No.: 354,024

[22] Filed: Mar. 2, 1982

[51] Int. Cl.$^3$ .............................................. H02J 7/14
[52] U.S. Cl. ...................................... 322/94; 320/59; 320/DIG. 2
[58] Field of Search .................. 322/28, 89, 90, 91, 322/94; 320/39, 59, DIG. 1, DIG. 2, 61, 40

[56] References Cited

U.S. PATENT DOCUMENTS

| | | | |
|---|---|---|---|
| 3,315,141 | 4/1967 | Wright et al. | 322/94 UX |
| 3,343,060 | 9/1967 | Ingraham | 320/40 |
| 3,857,082 | 12/1974 | van Opijnen | 320/59 X |
| 4,027,515 | 6/1980 | Yukawa | 320/59 |

FOREIGN PATENT DOCUMENTS 1252006 11/1971 United Kingdom ......... 320/DIG. 1

Primary Examiner—R. J. Hickey
Attorney, Agent, or Firm—Chapin, Neal & Dempsey

[57] ABSTRACT

A full wave rectifier regulator for an alternator battery charging system has gate controlled rectifier connected in two separate branches of the rectifier bridge. The gates of the rectifiers are connected to the anode-cathode circuit of a third gate controlled rectifier (SCR) and are thereby selectively turned "on" and "off" by the current flow in the anode-cathode path of the SCR. A portion of the alternator output voltage triggers the SCR to its conductive mode whenever the battery voltage is between predetermined voltage levels. A protection circuit comprising an electronic switching component is connected to the gate of the SCR to shunt off any gate triggering current to hold the SCR "off". The switching component is connected to sense the battery voltage and to clamp "off" the SCR should its voltage either be lower or higher than the predetermined levels. The regulator further includes means for shorting the output of the rectifier to its input terminals at a voltage substantially higher than the normal operating voltage levels of the system. A storage capacitor is also included to hold said SCR "off" for a predetermined time to prevent rapid cycling of the system about an abnormally high output voltage.

5 Claims, 1 Drawing Figure

ELECTRONIC REGULATOR FOR ALTERNATOR BATTERY CHARGING SYSTEM

BACKGROUND OF THE INVENTION

Permanent magnet alternators are widely used for a variety of battery ignition systems. In many of these systems, electronic voltage regulators are provided for small engines and must be economical to manufacture while being reliable in operation. These regulators usually provide some type of protective circuitry to prevent damage to the electronic components which could result if no battery is present or is improperly connected.

U.S. Pat. No. 4,146,831 discloses a regulated rectifier for an alternator battery charging system. The regulator of this patent includes a full wave bridge rectifier having a pair of silicon controlled rectifiers (SCRs) selectively rendered conductor to charge the battery with the output of the bridge rectifier whenever the battery voltage drops below a predetermined level. The patented circuit includes a pair of transistors connected for tandem operation, one to sense the battery voltage level and the other to be turned "on" thereby and to gate "on" the SCRs in the rectifier bridge.

It is the principal object of this invention to provide an improved electronic regulator for a battery charging system which, as compared to prior systems, is more reliable and provides greater circuit protection against high current flow resulting from either no battery load, improper battery connection or faulty battery operation.

Another object of this invention is to provide an electronic regulator of the above type in which protection is provided for its components against a sulfated battery being present in the system.

The above and other objects and advantages of this invention will be recognized from the following description read in connection with the accompanying drawing in which:

FIG. 1 is a circuit diagram of an electronic regulator for an alternator battery charging system of the type embodied in this invention.

In FIG. 1, as shown, a circuit diagram of a full wave voltage regulator for a permanent magnetic alternator. The output of the alternator represented by coil 2 has its opposite ends connected to input terminals 4 and 6 of a bridge-type full wave rectifier 8. The voltages applied by the alternator to these terminals are illustrated at a and $a^1$ on the diagram. The output terminals 10 and 12 of this bridge rectifier are connected to a battery illustrated at 14.

The bridge 8 includes four separate branches or legs, and two of these branches includes diodes 16 and 18 poled to pass the negative half wave voltages from terminals 4 and 6 to the output terminal 10. These negative output voltages are illustrated at b in the diagram. In each of the other two branches of the rectifier is connected a silicon controlled rectifier (SCR) 20 and 22. The anode cathode junction of each SCR is connected in series from the input terminals 4 and 6 to the output terminal 12 of the rectifier. Thus, when each SCR is biased to its conductive mode, it will pass half-wave voltages of positive polarity to the output terminal 12, while negative pulses are pased to terminal 10 for charging the battery 14. The positive pulses are illustrated at c in the drawing.

The control electrodes 24 and 26 of each of the SCRs in the bridge circuit are connected to a gate control circuits. For SCR 20, the gate control circuit comprises SCR 30 and diode 28 connected to the input terminal 4 of the bridge. The gate control circuit for SCR 22 comprises SCR 30 and diode 32, which is connected in circuit with the input terminal 6 of the rectifier. A biasing resistor 34 is connected across the anode gate electrodes of the SCR 30, which is biased well below forward breakover voltage, and triggering is accomplished by injecting a small amount of current into the gate 31. When the SCR 30 is triggered to its conductive mode, the SCRs 20 and 22 will be turned "on", and the battery will be charged by the direct current output of the rectifier. SCR 30 is alternately switched "on" by current flow through diodes 28 and 32. When switched "on", SCR 30 alternately gates SCR 20 and 22 "on" to carry positive current pulses to terminal 12 of the bridge. As soon as SCRs 20 and 22 are turned "on", SCR 30 is switched "off". The SCR 30 will be switched "on" whenever the battery voltage is between predetermined high and low voltage levels. SCR 30 will be held "off" by the shorting of its gate-current through either transistor 36 or SCR 38, whose emitter and cathode electrodes respectively are connected to ground. Thus, whenever either of these two components is switched to its low impedance mode, the gate current supply to SCR 30 will be shunted to ground and SCR will be clamped "off".

Transistor 36 has its collector electrode connected to junction 40 and its emitter connected through diode 42 to ground or the negative side of the battery 14 in the illustrated embodiment. The emitter of transistor 36 is also connected to output terminal 12 of the rectifier bridge 8 by diode 43. The base of transistor 36 is connected by junction 45 to ground through an adjustable resistor 44. Junction 45 is also connected to the positive battery terminal 12 via Zener diode 46, resistor 48 and diode 50.

With this circuit arrangement, transistor 36, which is normally "off" will be biased "on" when the voltage of the battery 14 exceeds a predetermined level over the rated voltage. When this battery voltage level is reached during the charging cycle, Zener diode 46, connected to the base of transistor 36, will break down, thereby switching the transistor 36 to its low impedance mode, and current will flow through the collector emitter electrodes of transistor 36 to ground. This transistor current flow shorts out the gate current of transistor 30 whereby transistors 20 and 22 in the bridge circuit are also held "off", and charging of the battery is interrupted.

The gate of SCR 30 is also connected from junction 40 to the anode of SCR 38. The cathode of this SCR is connected to ground or the negative side of the battery. The gate of SCR 38 is connected via junction 52 to junction 54 between resistors 56 and 58 of a voltage divider network. The opposite ends of these resistors are connected to the input terminals 4 and 6 of the rectifier bridge 8. Junction 52 is also connected through the collector emitter electrodes of transistor 60 to ground and the base of transistor 60 is connected through resistor 62 and diode 64 to the output terminal 12 of the bridge 8.

A protective circuit is provided by the transistor 60 and SCR 38 in the event that the alternator 2 is operated with no battery connected across the output terminals 10 and 12 of the rectifier. Without a battery load, or with reverse battery connections, the output current pulses of the alternator would reach excessive values and could result in damage to the other electrical components of the system.

When a battery having a voltage level within the predetermined range of the system is connected as shown at 14, transistor 60 will be switched "on" since its base will see a positive voltage at terminal 12 and its emitter electrode is connected to ground, i.e. the negative battery terminal. With transistor 60 turned "on", the gate of the SCR 38 is shunted through transistor 60 to ground, and SCR 38 will thereafter remain "off" unless the battery is disconnected or the level of its voltage is otherwise drastically reduced below a given level. In such an event, transistor 60 would be turned "off", and SCR 38 would be gated "on" by alternator current through resistor 56 and 58. With SCR 38 "on", the gating curent for SCR 30 will be shorted to ground, and SCR 30 will be held "off", as will SCRs 20 and 22 in the bridge 8.

Further, in accordance with this invention, should transistor 60 sense a battery voltage and be switched "on", excessive circuit current could still damage components if the battery does not provide sufficient load to carry safely the alternator output current. It has been found, for example, that this type of condition can occur with what is known as a "sulfated battery" wherein its voltage may be sufficient to bias transistor 60 "on", but its current carrying capacity nevertheless fails to provide an adequate load for the alternator output. Additional circuit protection is provided by a capacitor 66 connected across the base electrode of transistor 36 to ground and SCRs 68 and 70 connected to short the positive output pulses of the bridge back to the input terminals. SCR 68 has its anode cathode electrodes connected from the output terminal 12 of the rectifier to the input terminal and SCR 70 similarly connected from terminal 12 to terminal 4. The gates of these two SCRs are connected through blocking diodes 76 and 78, a voltage trimming resistor 74 and a Zener diode 72. Whenever the voltage sensed by the Zener diode 72 exceeds a perdetermined high voltage level, such as 20 volts in a 12 volt rated system, for example, the SCRs 68 and 70 are gated "on", and the output terminal 12 of the rectifier 8 is shunted to the input terminals 4 and 6 of the rectifier.

The output voltage of the rectifier is thus clamped at the 20 volt level of Zener diode 72, which is high enough so as not to interfere with the calibrated voltage, but well below the open circuit output voltage. Capacitor 66, which is also connected to terminal 12 through diode 50 will be charged by output pulses from rectifier terminal 12 up to approximately the 20 volt breakdown rating of Zener 72. With the capacitor charged to this value, it will discharge through resistor 48, Zener 46 and the base-emitter electrodes of transistor 36. Transistor 36 will thus be held "on" for a predetermined time until the voltage stored on capacitor 66 drains down to the rated voltage level of Zener diode 46. During this time interval, SCR 30 will be clamped "off" by transistor 36. Capacitor 66 thus prevents rapid cycling of the system from high to rated voltage with generation of excessive heat with probable thermal damage to circuit components.

Having thus described my invention, which is claimed is:

1. In a regulator rectifier for a permanent magnet alternator having a full wave rectifier bridge including a gate controlled rectifier connected in each of the branches of the rectifier from the input terminals to one of the output terminals thereof, a battery connected across the output terminals of said rectifier, the improvement comprising means for sensing the voltage level of said battery, including a voltage breakdown diode, a silicon controlled rectifier (SCR), including anode, cathode and gate electrodes, the anode of said SCR being connected to the input terminals of said rectifier and its cathode being connected with the gate electrodes of both said gate controlled rectifiers in the bridge circuit, the gate of said SCR also being connected to said input terminals to turn the SCR "on", a transistor having a collector-emitter path and base electrode, the collector-emitter path of said transistor being connected to the gate of said SCR, the base of said transistor being connected to said voltage sensing means, said transistor being rendered "conductive" by conducting current out of the SCR when the voltage level of the battery exceeds the breakdown voltage of said diode, whereby said SCR is switched to a nonconductive state when the battery exceeds a predetermined voltage.

2. In a regulator rectifier as set forth in claim 1, a second silicon controlled rectifier having its anode-cathode path connected to the gate of the first SCR and the gate of the second SCR also being connected to said voltage sensing means.

3. In a regulator rectifier the improvement as set forth in claim 1, and including a Zener diode and a pair of electronic switching components connected to short the output of the bridge rectifier to the input terminals thereof, said switching components being conductive in response to breakdown of said Zener diode connected in circuit therewith, a capacitor-resistor network being connected to the output terminal of said rectifier so that the capacitor will be charged to approximately the breakdown voltage of said Zener diode, said capacitor resistor network also being connected in circuit with said breakdown diode and to the base of said transistor to hold the said transistor "on" for a predetermined time until the voltage charge on said capacitor discharges below the voltage rating of the breakdown diode, whereby said SCR will be clamped "off" for said predetermined time to prevent rapid cycling of the system.

4. In a regulator rectifier as set forth in claim 2, in which a second transistor connected to sense the battery voltage causes the second SCR to turn "on", whereby the first SCR is turned "off" by either the first transistor or the second SCR.

5. In a regulator rectifier as set forth in claim 2, in which said voltage sensing means includes a voltage divider connected across the input terminals of said bridge and a second transistor having its collector-emitter path connected in circuit with the gate of second SCR which is also connected to said voltage divider, said second SCR being rendered "nonconductive" by current through the collector-emitter path of said second transistor which has its base and emitter electrodes connected to sense the battery voltage, said second transistor being biased "on" by battery voltage within a given range and being turned "off" upon sensing a battery voltage lower than said voltage range, said second SCR being thereby turned "on" by said voltage divider when said second transistor is biased "off", said first transistor being turned "on" by current flow through said breakdown diode above the upper level of said voltage range, whereby the first SCR is turned "off" when the first transistor or second SCR is turned "on" so that the output of said bridge will not charge the battery when the voltage is greater or less than said given range.

* * * * *